US007055615B2

(12) United States Patent
Dillman

(10) Patent No.: US 7,055,615 B2
(45) Date of Patent: Jun. 6, 2006

(54) METHOD OF EXTINGUISHING FIRES

(75) Inventor: Bruce A. Dillman, Cape Coral, FL (US)

(73) Assignee: Gulf Coast Hot Mix Equipment Leasing, Inc., Prairie du Chein, WI (US)

( * ) Notice: Subject to any disclaimer, the term of this patent is extended or adjusted under 35 U.S.C. 154(b) by 2 days.

(21) Appl. No.: 10/630,341

(22) Filed: Jul. 30, 2003

(65) Prior Publication Data

US 2004/0055765 A1 Mar. 25, 2004

Related U.S. Application Data

(60) Provisional application No. 60/399,896, filed on Jul. 31, 2002.

(51) Int. Cl.
*A62C 2/00* (2006.01)
*A62C 27/00* (2006.01)
*A01G 25/09* (2006.01)

(52) U.S. Cl. ............................ 169/46; 169/24; 169/47; 239/146; 239/172

(58) Field of Classification Search .................. 169/12, 169/46, 47, 52, 70, 67, 91, 24; 180/9.34, 180/9.36, 209, 24.02, 41; 239/172, 146
See application file for complete search history.

(56) References Cited

U.S. PATENT DOCUMENTS 1,598,568 A 8/1926 Fields
2,891,624 A 6/1959 McBride
3,033,292 A 5/1962 Browning
3,128,036 A 4/1964 McBride
3,620,321 A * 11/1971 Thibodeau .................. 180/16
3,947,365 A * 3/1976 Cottrell et al. ................. 252/5
4,113,019 A 9/1978 Sobolev et al.
4,679,803 A * 7/1987 Biller et al. ............... 180/9.23
5,046,564 A 9/1991 Poulsen
5,165,483 A 11/1992 Fox
5,211,245 A * 5/1993 Relyea et al. ................. 169/24

FOREIGN PATENT DOCUMENTS

GB 908890 10/1962

* cited by examiner

*Primary Examiner*—Davis Hwu
(74) *Attorney, Agent, or Firm*—Wallenstein Wagner & Rockey, Ltd.

(57) ABSTRACT

A method for subduing a fire (70) is disclosed. This method is performed by operating a jet turbine (20), having an exhaust (22), to direct the exhaust (22) into a moving front of the fire (72), generally against the movement of the front of the fire (72). A retardant (30), preferably dust, is directed from a supply tank (40) into the exhaust (22), through a pressurized conduit (42). Alternately, dust or other material (32) is lifted from the land around the fire (70) and blown into the fire (70), extinguishing the fire (70) or decreasing its intensity. To completely extinguish the fire (70), it may be necessary to further douse the fire with either or both water and a second retardant.

3 Claims, 14 Drawing Sheets

METHOD OF EXTINGUISHING FIRES

CROSS-REFERENCE TO RELATED APPLICATION

This application claims priority to U.S. Provisional Patent Application No. 60/399,896, filed on Jul. 31, 2002.

TECHNICAL FIELD

The present invention relates to fighting fires, and more particularly, to a method and apparatus using pressurized air and dust to reduce the temperature of a fire so that the fire is either extinguished or can be doused with water and/or chemicals.

BACKGROUND OF THE INVENTION

Fires are a serious problem today. Large fires rage out of control sweeping through woods/forests, communities, industrial areas (e.g., refineries, power plants, etc.) and businesses resulting in tremendous loss of forests/woods, homes, other property, animals and even human life. Efforts employed to contain fires are not always successful. Controlling and preventing the spread of fires is often a difficult and dangerous undertaking.

There are presently accepted methods and techniques for controlling and preventing the spread of fires. These methods include traditional uses of firefighters and equipment, including such techniques as the dumping of large amounts of water or fire suppressing chemicals from aircrafts onto the fire, creating fire lines across the direction of travel of the fire, spraying water or fire suppressing chemicals onto the fire by firefighters on the ground, and back burning an area towards the fire in a controlled manner so as to effectively remove wood or other sources of fuel from an approaching fire.

Water and chemicals are often ineffective against fires. In particular, at times the fire's intensity is so great that the water or chemicals evaporate or disintegrate before reaching the core of the fire. This is true whether the water or chemicals are dropped or sprayed over the top of the fire, or are sprayed directly into the fire. The water or chemicals thus do little to put out the fire. Further, some fire retardant chemicals damage the environment and ecosystem. Therefore, there is clearly a need to douse fires by materials other than water or chemicals and a need to reduce the temperature of the fire so that water and/or chemicals can be effective.

Presently accepted methods for fighting fires have an additional disadvantage, as they are designed only to extinguish the flames and not to stop the forward progress of the fire. Simply dousing the fire with water or chemicals from above will do nothing to stop a fire's progress. This often renders them ineffective in fighting quickly spreading fires, such as a wind-blown forest or brush fire. Therefore, there is also a need for a method of halting the forward progress of a moving fire and preventing it from spreading until it is extinguished.

SUMMARY OF THE INVENTION

According to a first aspect of the present invention, a method for subduing a fire by operating a jet turbine is disclosed. The exhaust of the commercial turbine is directed into a moving front of the fire, generally against the movement of the front of the fire. Dust or another retardant from a supply tank is fed into the exhaust, along with either or both water and another retardant. According to a further aspect of the invention, the dust is selected from the group consisting of: granite dust, limestone dust, and fine sand. In another aspect of the invention, the method is used to subdue a forest fire or brush fire and the retardant is a chemical flame retardant. The dust is directed into the exhaust through a pressurized conduit having an opening proximate the exhaust.

The present invention is a method for subduing a fire by operating the jet turbine's exhaust into a front of the fire (the firewall), an edge of the fire, or the area just in front of the fire. The high-powered exhaust dislodges material, such as dust, from land or ground near the fire, blowing the material into the fire. This technique is much more effective than lofting water, dust, or chemicals great distances over the fire front into a central part of the fire, with the aid of the engine.

The apparatus for subduing a fire associated with the above method includes a jet turbine (having a high-powered exhaust), a vehicle, and a support for the jet turbine supporting the jet turbine and permitting the jet turbine to rotate in multiple planes. The support is affixed to the vehicle. A counterbalancing mechanism is further affixed to the vehicle and comprises a weight and a powered cylinder, such as a hydraulic cylinder, attached to the weight capable of moving the weight to stabilize the system. According to a further aspect of the invention, the apparatus also includes at least two, and preferably three, fuel tanks connected to the jet turbine along with multiple pumps for transferring fuel. The apparatus also includes a supply of dust or another retardant, a conduit connected to the supply of retardant for transporting the retardant into the exhaust, and a compressor for forcing the retardant through the conduit.

In another embodiment, a moveable crane boom is affixed to the vehicle. An adjustable nozzle is attached to the crane, and a supply of dust or another retardant is moved via a compressor and a conduit to the nozzle. According to a further aspect of the invention, an exhaust tube is affixed to the crane boom and directs the turbine exhaust to a position proximate the adjustable nozzle.

BRIEF DESCRIPTION OF THE DRAWINGS

In the accompanying drawings forming part of the specification, and in which like numerals are employed to designate like parts throughout the same.

DETAILED DESCRIPTION OF THE INVENTION

Figure 1:
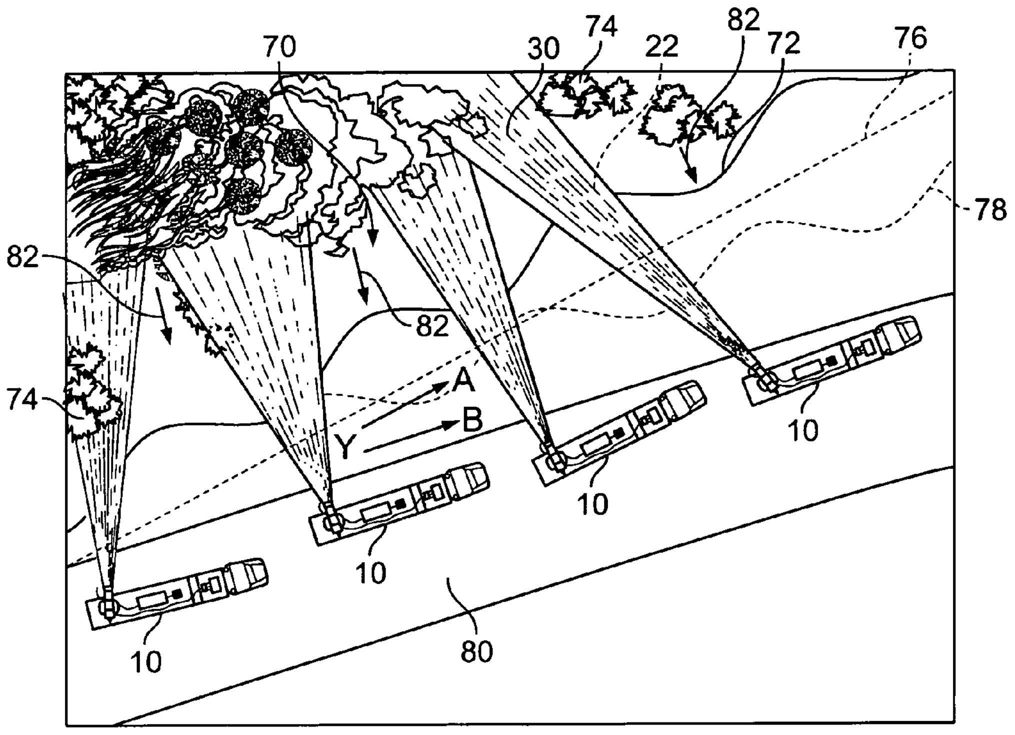
FIG. 1 is a top plan view of the apparatus and procedure employed to practice the present invention.

The present invention is embodied in a method for subduing a fire, as well as an apparatus for performing the disclosed method.

While this invention is susceptible of embodiment in many different forms, there are shown in the drawings and will herein be described in detail preferred embodiments of the invention with the understanding that the present disclosure is to be considered as an exemplification of the principles of the invention and is not intended to limit the broad aspect of the invention to embodiments illustrated.

Non-flammable substances, such as dust, quench fire. By applying dust to a fire, one reduces the oxygen available to the fire. This can, in and of itself, extinguish a fire. If the fire is not extinguished, the dust will reduce the intensity, and hence temperature, of the fire. By reducing the temperature of the fire, one can more successfully apply water, chemicals, or other retardants to the fire and extinguish it.

By dust, Applicant means fine particulate of earth or pulverized matter. It is generally granulated material, capable of passing through a 200 sieve. Ideal dust particulate to use with the present invention should also be inert and not react with foliage and animals if left after a fire. Granite and limestone dust particulate are two suitable substances for the present use. Fine sand (such as that used in sandblasting) is also suitable. Significantly, all three of these substances, as well as many others, can be left in place after a fire has been extinguished; it is believed they do not negatively affect the environment or ecosystem if left in place. In short, the substances are generally inert and ecology friendly.

While dust is the preferred substance, many other fire retardants function suitably to extinguish a fire. Some retardants, while effective in subduing fires, are less favorable because they may potentially damage the environment. Water, a common retardant, can effectively quench smaller fires without damaging the environment, but often cannot (or should not) be used to quench larger fires because it vaporizes before it reaches the combustible zone or area of the fire. Dust does not present such a vaporization concern as it does not typically vaporize under such conditions.

Two primary embodiments of the apparatus for practicing the method of the present invention are now detailed, with variations of each also explained. In the first embodiment, dust is collected and transported to the fire in a dust supply tank. This dust is then directed from the supply tank into the exhaust of a large, industrial or commercial turbine, which blows the dust into the fire. In another, second embodiment, a dust supply tank is not employed. Instead, the turbine's or engine's exhaust is blown directly into the fire, and the force of the exhaust raises the dust from the land surrounding the fire, blowing this lifted dust directly into the fire. Additionally, a variation of the above embodiments is disclosed, incorporating a crane boom with a nozzle attached to the boom. These embodiments are disclosed below, as well as the apparatus for performing these methods.

I. Apparatus

The preferred apparatus for practicing the claimed method is a mobile firefighting unit or assembly 10, and comprises (A) a jet turbine 20 drawing surrounding or ambient air therein and therethrough to an exhaust 22; (B) a vehicle 12; (C) a support 24 for the jet turbine 20 permitting the jet turbine 20 to rotate in multiple planes (e.g., horizontally and vertically); (D) an adjustable nozzle 28 connected to the jet turbine 20; (E) a supply of dust 40; (F) a conduit 42 connected to the supply of dust 40 for transporting the dust 30 into the exhaust 22 (and not through the turbine 20); (G) at least two compressors 44,46 for forcing the dust 30 through the conduit 42; (H) a counterbalancing mechanism 60 affixed to the vehicle 12 for counteracting the forces applied to the turbine 20 (e.g., its exhaust 22); (I) a three-part fuel tank 50 connected to the jet turbine 20; and, (J) a pump 58 for transferring fuel from the three tanks 52,54,56 to the turbine 20.

A. Preferred Embodiment of the Apparatus

1. Turbine

Because there may be a considerable distance between the physical turbine 20 and the front, or leading edge 72, of a fire 70, the turbine 20 should be capable of generating exhaust pressure 22 sufficient to blow significant quantities of dust 30 into the fire 70 from such a distance. Any Pratt & Whitney JT8 through JT30 Series Turbine is sufficiently capable. These are extremely common engines, employed for several decades on a multitude of commercial aircraft. The velocity of the exhaust 22 produced by a JT8 turbine, at full thrust, is approximately 450 miles per hour at a distance of 150 feet from the turbine 20. However, at 500 feet this velocity decreases to about 60 miles per hour. Additionally, it is preferable not to operate the turbine 20 at over 80% of total (100%) power output in an attempt to reduce exhaust 22 temperatures. As such, the JT8 turbine is capable of operating effectively when placed approximately 200–300 feet from the fire line or front 72 of the fire 70. Of course, other turbines fully capable of use in the present circumstances for the present job may have different effective ranges.

It should be noted that while the turbine 20 used in the present invention is described as a jet turbine, any non-jet turbine capable of producing suitable exhaust 22 pressures and/or velocities can also be very effective.

Preferably, the turbine 20 draws air in from its surroundings (ambient air), passes this air through its interior and creates an exhaust 22. The inlet 18 of the turbine 20 has a protective grate and a shield with a 90-degree scoop (not shown), reducing the possibility of debris entering the intake 18 for the turbine 20 and potentially causing damage.

While the discussion above discusses the use of a single turbine 20, more than one turbine 20 can be employed in each unit 10. This is advantageous for increasing the power of the unit 10 by creating a larger or stronger exhaust stream 22.

2. Vehicle

The unit 10 includes a vehicle 12 to facilitate transportation of the equipment to the site near the fire 70. The vehicle 12 is a trailer 14 with a flat bed 15, towed by a truck 16 or bulldozer (not shown), as shown in FIGS. 2–6, which allows the unit 10 to be easily transported to a desired location, typically in front of the advancing fire line 72. Preferably, the trailer 14 is a standard over the road, heavy-duty lowboy trailer with a 50–60 ton capacity. Such a trailer 14 is large enough to carry other components of the invention, such as a fuel tank 50, a dust supply tank 40, and/or a counterbalancing mechanism 60. Notably, the total weight of the vehicle 12 and all the components of the preferred embodiment of the invention is around 50 tons. A relatively heavy vehicle 12 is preferred so that it can carry or pull the necessary equipment, and so the vehicle 12 remains stationary and planted while the turbine 20 is operating. During operation, neither the vehicle 12 nor the turbine 20 should slide or leave the ground. It is understood that conditions may necessitate the vehicle 12 having greater off-road capabilities and stability (when parked) than a standard truck 16 and trailer 14 in order to reach the optimum position for subduing the fire 70. In addition, it is recognized that a bulldozer may be more effective in many situations. The vehicle 12 withstand the high temperatures and difficult conditions encountered in fighting the fire 70, such as dust, debris, and water. Additionally, the vehicle 12 could be remote-controlled in order to avoid risking the lives of operators by placing them in the path of the fire 70. For example, the remote-controlled vehicle 12 can be controlled from an aircraft or a distant hill or observation deck, possibly with the aid of a magnification device or video equipment.

If the vehicle 12 is not remote controlled, it is essential to ensure the safety of the operator(s). Accordingly, it is desirable to shield the operating compartment from a potential explosion from a turbine 20 or fuel tank 50 operating under such conditions. The present invention accomplishes this by incorporating a half-inch thick plate 13 of tank steel welded to the frame of the vehicle 12 forward of the turbine 20. This armor plate 13 deflects any potential shrapnel resulting from such an explosion.

3. Support

Figure 12:
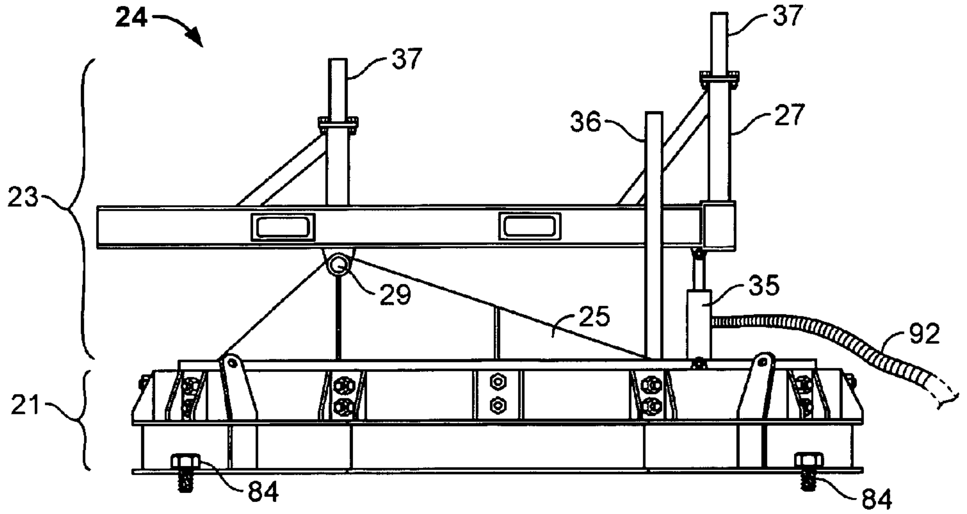
FIG. 12 is a side elevation view of the support for the turbine.
Figure 13:
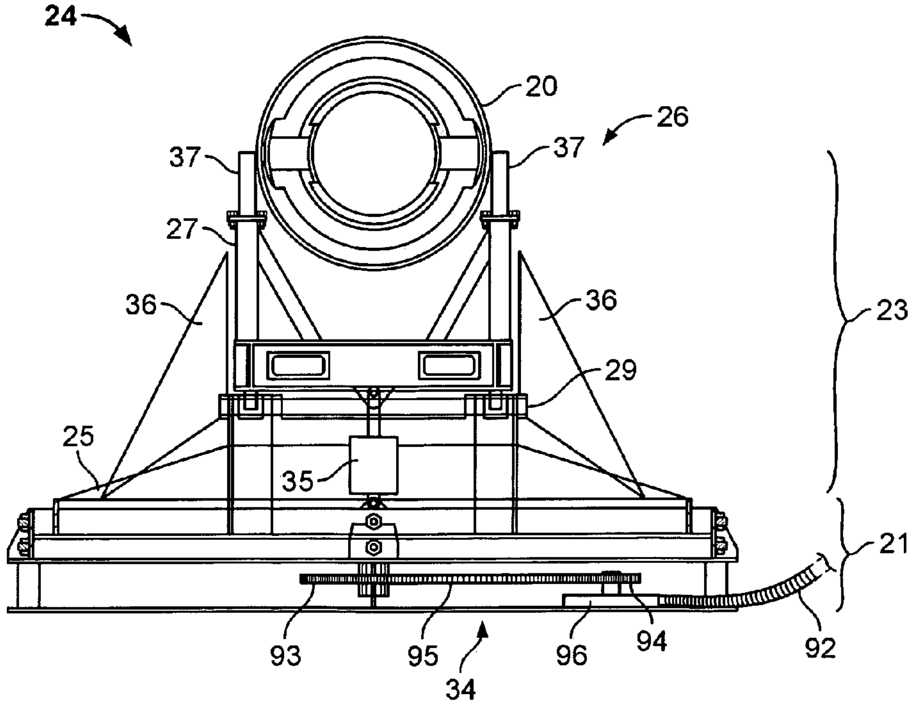
FIG. 13 is a partial cross-sectional front elevation view of the turbine assembly, with the base of the support in cross-section and the lower portion of the frame of the support in partial cross section.

Advantageously, the turbine 20 is mounted on a support 24 that serves the dual function of supporting the weight of the turbine 20 and of permitting the turbine 20 to be moved, e.g., aimed in a multitude of directions. The turbine 20 and support 24 together form a turbine assembly 26, illustrated in FIGS. 12 and 13. In the preferred embodiment, the support 24 allows the turbine 20 to rotate 360 degrees in the horizontal plane and at least 20 degrees vertically upward or downward. The support generally includes a base 21 and a frame 23.

The base 21 is firmly affixed to the constructional members of the trailer 14 with Grade A 1¼" bolts 84 with a 10 to 1 safety factor. A lower portion 25 of the frame 23 is rotatably connected to the base 21. The base 21 has a pivoting mechanism 34 for rotating the frame 23, including a large chain sprocket 93 affixed to the bottom of the lower portion 25, a smaller drive sprocket 94 turned by a hydraulic motor 96, and a chain 95 connecting the two sprockets 93, 94. The hydraulic motor 96 is provided with an internal brake and locking system for restraining rotation when necessary.

The frame 23 also has an upper portion 27 attached to the lower portion 25 by a hinge 29. The hinge 29 permits the upper portion 27 to be elevated and lowered, i.e., to rotate in a vertical plane. The upper portion 27 is specially designed by Pratt & Whitney to affix to a JT8 turbine 22 to facilitate handling and attachment of the turbine 20 to an aircraft. The lower portion 25 includes two braces 36, supporting the weight of the upper portion 27 and the turbine 20, as well as providing lateral stability throughout the range of vertical rotation. The upper portion 27 is raised and lowered by a heavy-duty hydraulic cylinder 35 held in a desired position with pressurized oil on both sides of the piston. The upper portion 27 has traditional aircraft engine supports 37 for holding the turbine 20 in place, and is securely bolted to the turbine using eight chrome bolts (not shown) on both sides.

Rotation in the horizontal plane allows the exhaust 22 to be directed towards the desired target, such as a moving, dynamically evolving fire 70. Rotation in the vertical plane allows for more precise aiming of the exhaust 22 on different terrains, as well as directing the exhaust 22 at higher points in the fire 70 or at the ground near the fire 70, in order to raise dust 32 from the land.

4. Nozzle

Figure 19:
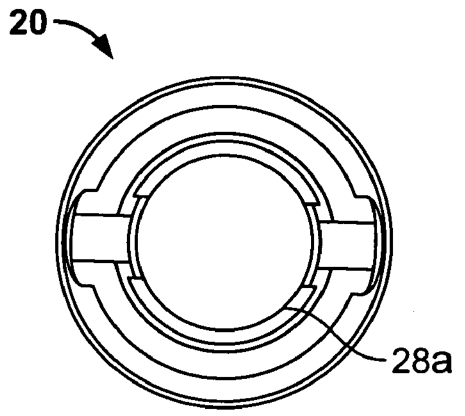
FIG. 19 is a front view of a standard nozzle for the turbine.
Figure 20:
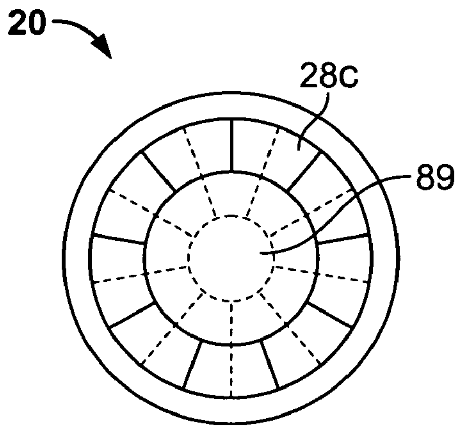
FIG. 20 is a front view of a hydraulically adjustable variable configuration nozzle for the turbine; and, FIG. 21 is a front view of a rectangular nozzle for the turbine.
Figure 21:
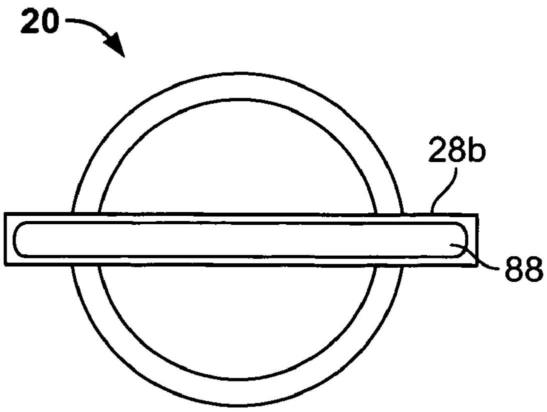

The turbine 20 has an adjustable nozzle 28 at the outlet 19 that expands or contracts to control the exhaust 22. Three different types of nozzles are used in the present invention. The first nozzle type 28*a* is a standard 18" circular turbine nozzle, as is shown on the turbine in FIG. 19. The second nozzle type 28*b* is attached to the first nozzle using stainless steel screws, and has a wide, rectangular opening 88, as shown in FIG. 21. This rectangular opening is approximately 4" high and 64" wide, so that it has a cross-sectional area equal to that of the first nozzle 28*a*. The wide opening of the second nozzle 18*b* spreads the exhaust over a wider area than a circular nozzle, giving the unit 10 a wider area of coverage. The second nozzle type 28*b* can be adjusted by using a gate (not shown) to increase or decrease the width of the opening, altering the area and velocity of the exhaust 22. Preferably, the first 28*a* and second nozzle types 28*b* are used in combination to adjust the exhaust 22. Alternately, a third nozzle type 28*c* is a hydraulically adjustable variable configuration nozzle, having a hydraulically adjustable opening 89 to change the exhaust from a narrow, high-velocity air stream to a lower-velocity air stream spread over a larger area, as shown by the dotted lines in FIG. 20. Nozzles 28 such as the one used in the present invention are known in the art and are commonly used to control turbine exhaust 22 in many industrial and commercial applications.

5. Supply Tank

In one embodiment of the present invention, dust 30 is directed into the turbine's exhaust 22 through a conduit 42 connected to a dust supply tank 40. Preferably, the dust supply tank 40 is securely fixed on the trailer 14 with the turbine assembly 26 and fuel tank 50, forming a single, self-contained unit 10, shown in FIGS. 2 and 5. Using more than one dust supply tank 40 on the trailer 14 increases the dust-carrying capacity of the unit 10. Alternately, the dust supply tank 40 can take the form of a separate mobile dust tanker 140 (FIG. 15) and may be self-powered or towed behind the trailer 14 or by another vehicle. Use of a separate dust tanker 140 is advantageous because continuous replacement of empty dust tankers 140 provides a potentially infinite source of dust 30. It is also recognized that any tank

40 suitable for holding and dispensing solid and powder-like chemicals or substances is effective in the present invention. Such tanks 40 are well known to those skilled in the art.

The tank 40 is pressurized using a compressor 44 to force dust 30 out of the tank 40 and into a supply conduit 42. Alternately, another mechanism may be used to move dust 30 into the conduit 42 including, without limitation, a mechanical device such as an auger or conveyor (not shown), or gravity. Preferably the bottom of the tank 40 has two frustoconical sections 48 to assist in feeding dust 30 into the conduit 42, each frustoconical section 48 having a valve 47 to open or cut off the flow of dust 30 into the conduit 42. Other means of moving, carrying, and forcing dust 30 into and through the conduit 42 are well known. For example, the dust 30 can be carried in an open tank 40, such as a standard dump truck or cement truck, and moved into and through the conduit 42 by suction created by an air pump.

Alternately, other retardants 30 may be used with the present invention in lieu of or in addition to dust. Many such retardants 30 are in solid powder form so a tank 40 suitable for supplying dust 30 can also be used to supply these retardants 30. For other forms of retardants 30, a different style or type of tank 40 may be necessary; for example, a liquid storage tank for a liquid retardant 30. In short, the tanks 40 employed must match the retardant 30 employed, a practice well known to those skilled in the art. Further, two separate tanks 40 can be used with two different retardants 30 if such an application is desirable.

It should be noted that in yet another embodiment, no dust 30 is introduced via a supply tank 40 into the turbine exhaust 22. Rather, the exhaust 22 is directed into the fire 70 and is either free of dust 30 or carries with it dust 32 raised by the force of the exhaust 22 from the grounds adjacent the fire 70.

6. Supply Conduit

Figure 2:
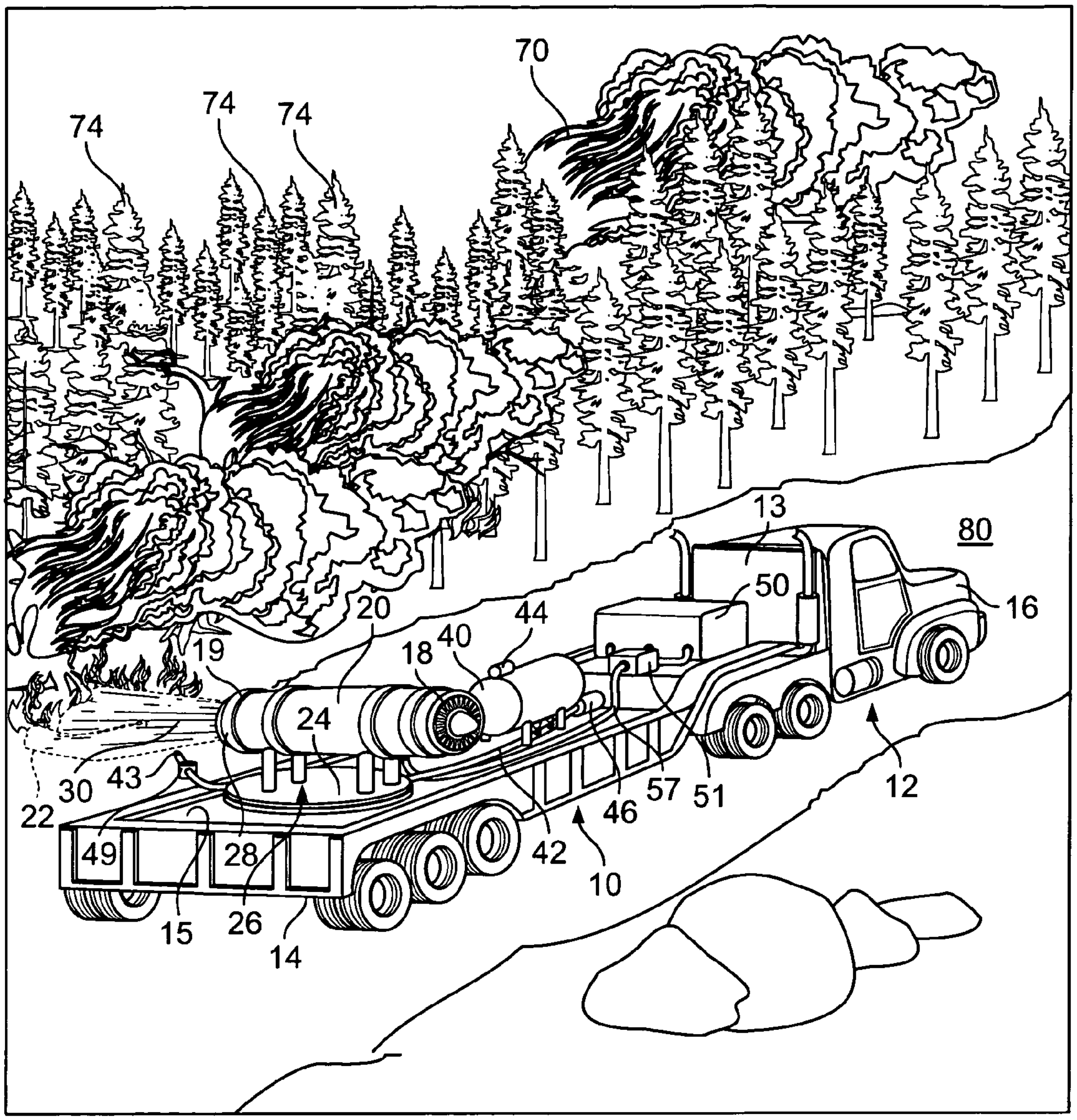
FIG. 2 is a perspective view of the apparatus and procedure employed to practice the present invention wherein dust is supplied from a dust supply tank.
Figure 3:
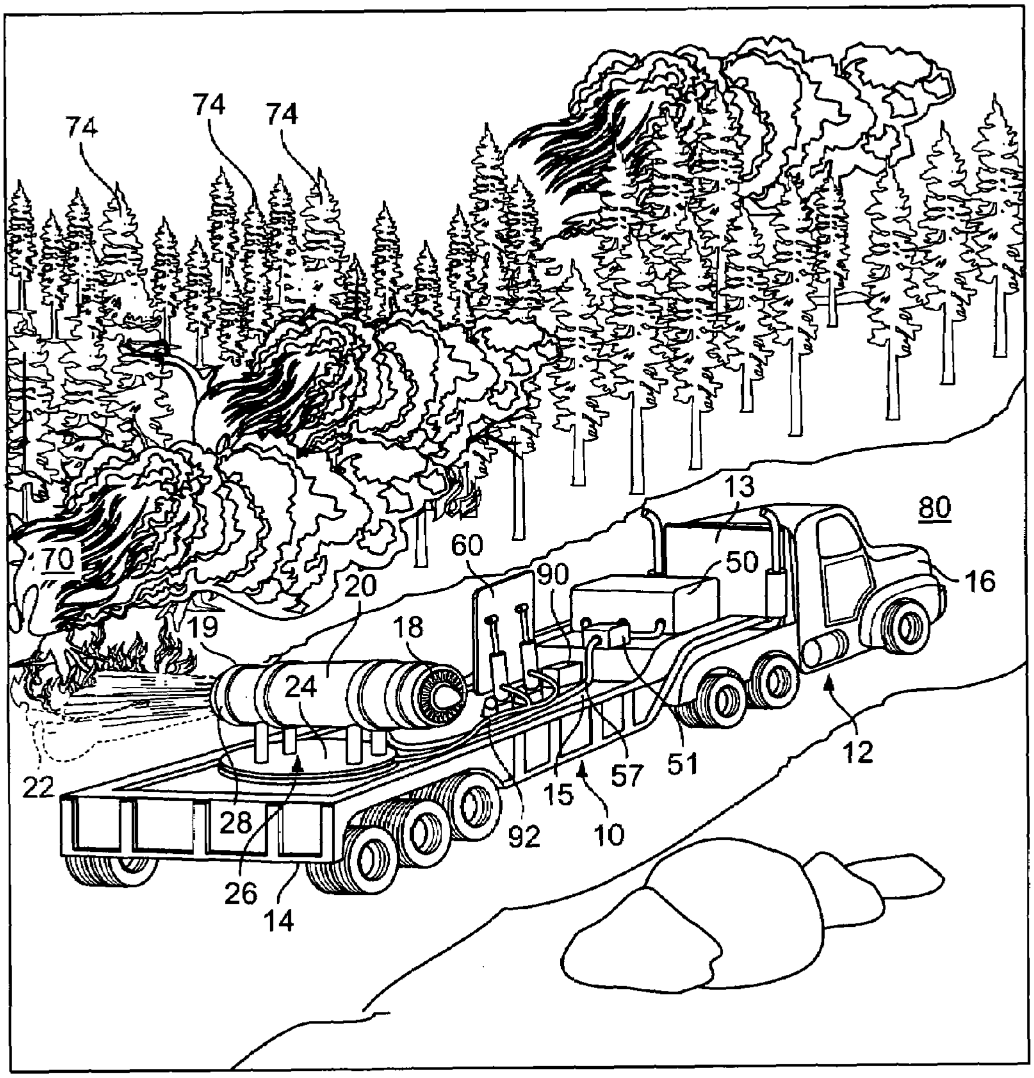
FIG. 3 is a perspective view of the apparatus and procedure without employing a dust supply tank.
Figure 4:
FIG. 4 is a perspective view of the apparatus and procedure wherein a turbine is used to blow material from the surrounding land into the fire.
Figure 5:
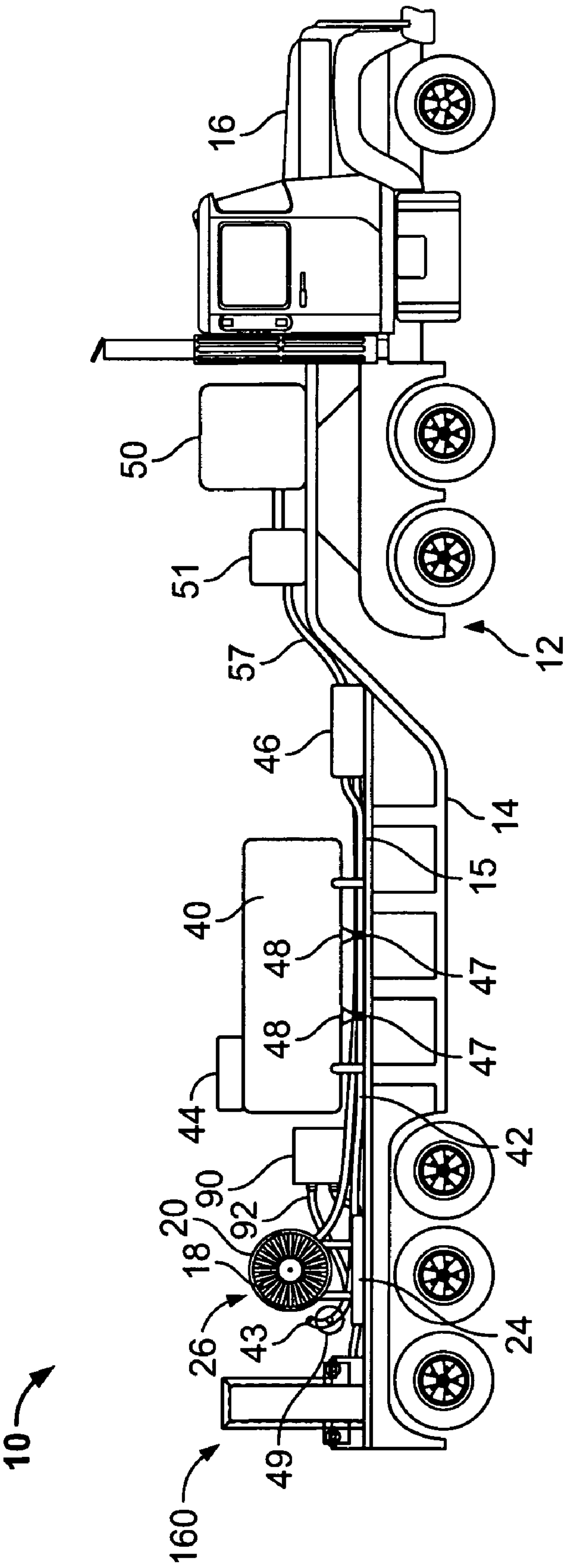
FIG. 5 is a side view of the apparatus wherein dust is supplied from a dust supply tank, with a counterbalancing mechanism attached to the apparatus.
Figure 6:
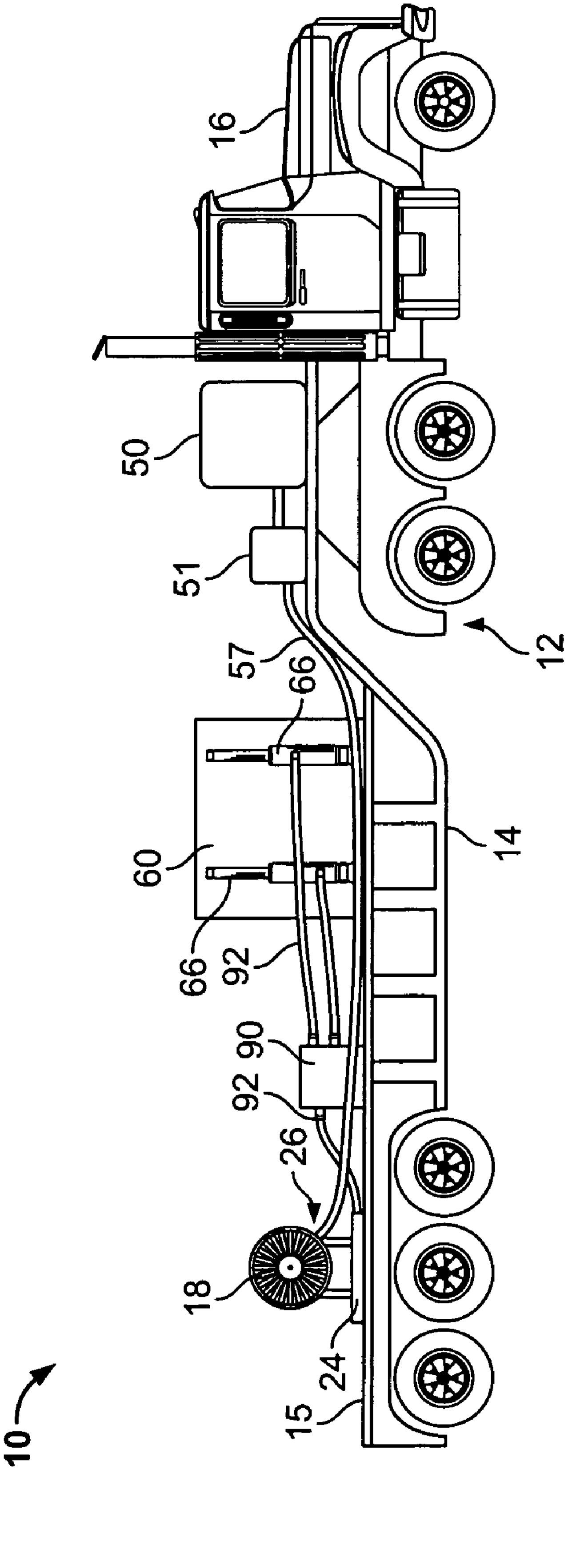
FIG. 6 is a side view of the apparatus wherein dust is not supplied, with a counterbalancing mechanism attached to the apparatus.

A conduit 42 transports the dust 30 from the dust supply tank 40, around the turbine 20, and into the exhaust stream 22 of the turbine 20, see FIGS. 2 and 5. This conduit 42 may take any one of a number of forms known to those in the art, such as a rigid or flexible pipe, tube, or hose. Preferably, a compressor 46 forces dust 30 through the supply conduit 42 from the supply tank 40 to the exhaust 22 of the turbine 20. Accordingly, a flexible hose 42 capable of being pressurized is preferred. It is recognized that other means of transporting the dust 30 through the conduit 42 are effective including, for example, an auger or conveyor. The conduit 42 terminates, or has an opening 43, proximate the exhaust 22 to facilitate introduction of the dust 30 into the exhaust 22. A regulator 49 is also employed to control the amount, or flow, of dust 30 (or other retardant) through the conduit 42 and into the exhaust 22.

As noted, other retardants 30 may be employed in and with the present invention in place of dust 30. Many such retardants 30 will be in solid powder form, so a conduit 42 suitable for transporting dust 30 is suitable for transporting these other retardants 30. For other forms of retardants 30, a different type of conduit 42 may be necessary, for example a pressurized liquid pipe for a liquid retardant. Two or more separate conduits 42, leading from two or more separate tanks 40, can be used with two different retardants 30 if such an application is desirable. Further, if no supply tank 40 is used, no conduit 42 is necessary.

7. Compressor

In the preferred embodiment, dust 30 is transported through the conduit 42 using compressors 44,46 to force pressurized air through the conduit 42, as shown in FIGS. 2 and 5. The required compressor 44,46 generates sufficient pressure to transport the volume of dust 30 the required distance at sufficient velocity. Preferably, two compressors 44,46 are used: a tank compressor 44 which pressurizes the tank 40, pushing dust 30 into the conduit 42, and an in-line compressor or blower 46 to force dust 30 through the conduit 42. The tank compressor 44 is typically capable of creating pressure of 20 psi to 50 psi. The in-line compressor 46 is typically capable of generating higher pressure of 120 psi to 150 psi. Compressors such as these are commercially known as “dust blowers” and are typically used on cement tankers.

The compressor or compressors 44,46 will, of course, vary depending on the retardant 30 used. As such, the type and nature of the retardant 30, conduit 42, tank 40, flow rate and volume will dictate the compressor(s) 44,46 employed. For example, different retardants 30 have different densities, and accordingly require more or less powerful compressor(s) 44,46 to transport them through the conduit 42. Those skilled in the art should be able to select or match the appropriate components. If two separate retardant tanks 40 are used, additional compressors are useful. Finally, if no supply tank 40 is used, no compressors 44,46 are necessary.

8. Counterbalancing Mechanism

Powerful turbines 20 naturally generate a significant force. This force transfers to the structure 24 supporting the turbine 20 and the vehicle 12 supporting the turbine assembly 26, creating a torque on the vehicle 12 and potentially causing roll-over. To prevent roll-over, the unit 10 includes a counterbalancing mechanism 60 to counteract the force of the turbine 20. The counterbalancing mechanism 60,160 operates by moving a weight 62,162 to one side of the vehicle 12, so that the gravitational force on the weight 62,162 exerts sufficient torque to counteract the torque created by the turbine 20.

Figure 17:
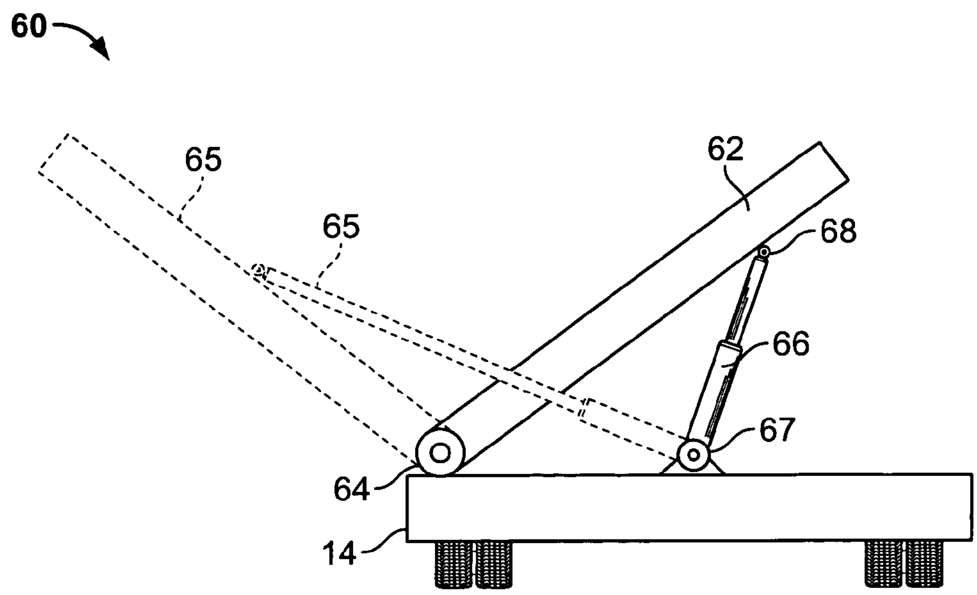
FIG. 17 is a rear view of a counterbalancing mechanism affixed to the trailer.
Figure 18:
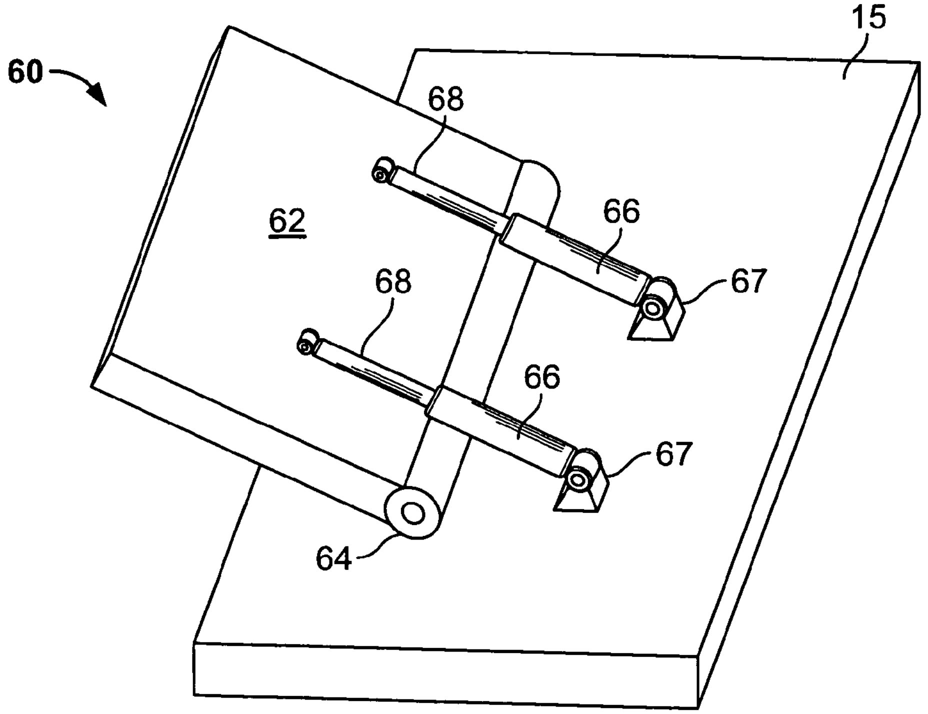
FIG. 18 is a perspective view of the counterbalancing mechanism of FIG. 17.

As illustrated in FIGS. 17 and 18, the counterbalancing mechanism 60 comprises a weight 62, a pivot 64, and two hydraulic cylinders 66 affixed to the trailer 14 and able to rotate the weight about the pivot 64. The weight is a 6" thick steel plate weighing approximately 10 tons, and the cylinders are extremely heavy 7" diameter hydraulic cylinders. Each cylinder 66 has a fixed end 67 rotatably attached to the bed 15 of the trailer 14, and an extension end 68 rotatably attached to the weight. The pivot 64 is securely fixed to the bed 15 of the trailer 14, and the weight 62 is rotatably attached to the pivot 64. As the cylinders 66 extend, the weight 62 is rotated about the pivot 64, shifting its weight towards the left side of the vehicle 12, as illustrated by the arrows in FIG. 17. With the cylinders 66 fully extended, the weight 62 is hanging over the left side of the vehicle 12, providing tremendous torque on the vehicle 12 to counteract the force of the turbine 20.

Figure 9:
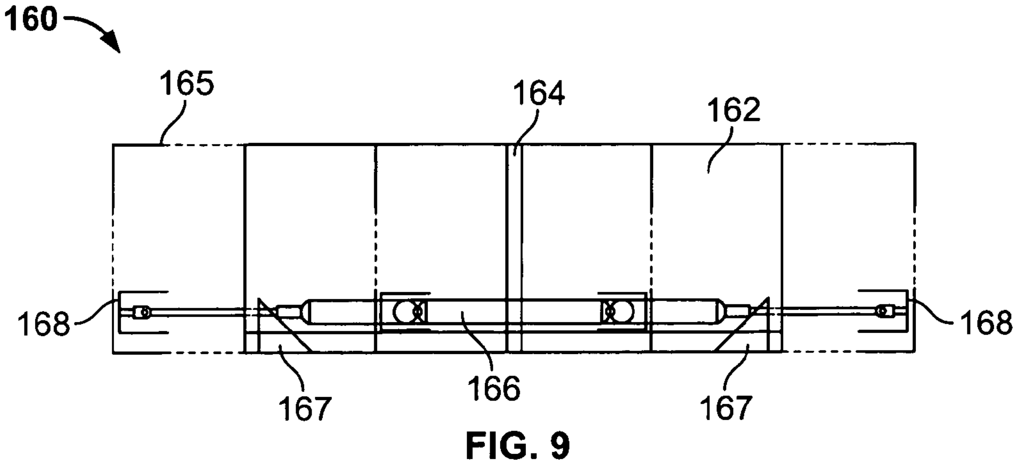
FIG. 9 is a rear elevation view of a counterbalancing mechanism.
Figure 10:
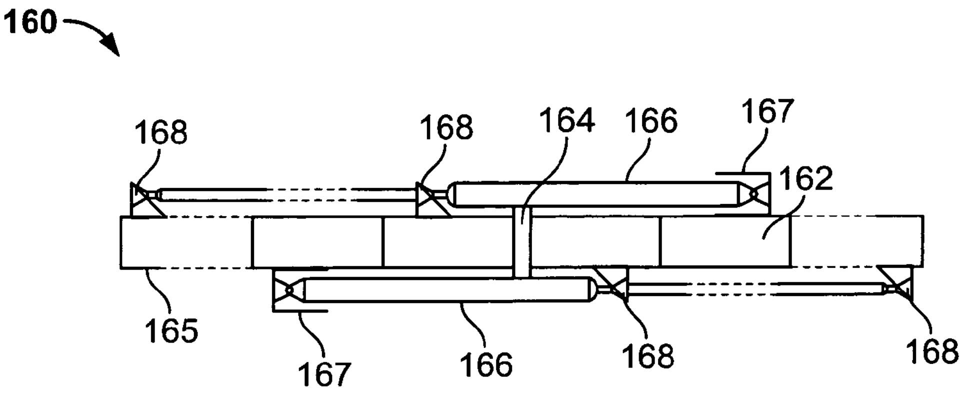
FIG. 10 is a top plan view of the counterbalancing mechanism of FIG. 9.
Figure 11:
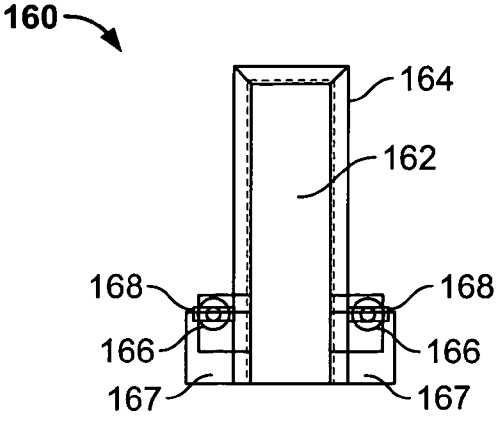
FIG. 11 is a side elevation view of the counterbalancing mechanism of FIG. 9.

Alternately, as illustrated in FIGS. 9–11, the counterbalancing mechanism 160 comprises a weight 162, a mount 164, and two opposed hydraulic cylinders 166, able to move the weight 162 in opposite horizontal directions. The weight 162 extends through a passage in the mount 164. The mount 164 is securely fixed to the trailer 14 and supports the weight 162, preventing the weight 162 from tipping. The two cylinders 166 work in a complementary manner to move the weight 162, one extending while the other is contracting. Each cylinder 166 has a fixed end 167, which is fixed securely to the bed 15 of the trailer 14, and an extension end 168, which is fixed securely to the weight 162. As one cylinder 166 extends, the extension end 168 moves the weight 162 farther from the centerline of the trailer 14. This both increases the moment of inertia of the entire trailer 14 and creates a torque on the trailer 14 due to the uneven weight distribution. These two effects combine to counteract the torque exerted on the trailer 14 by the force of the jet exhaust 22. The weight 162 is moveable in either horizontal direction to facilitate counterbalancing if the direction of the turbine 20 is changed, as shown by the dotted lines 165 in FIGS. 9 and 10. Additionally, having two weights 162, rather than a single weight 162, may be desirable under certain circumstances or conditions.

9. Fuel Tank and Pumps

A fuel tank 50 is necessary to supply the turbine 20 with fuel, as shown in FIGS. 2–6. Any fuel tank 50 of suitable size to keep the turbine 20 in operation for a sufficient time period is sufficient. Preferably, the fuel tank 50 is insulated to protect the contents from heat and has a capacity of about 2,000 to 8,000 gallons. The fuel tank 50 is mounted on the vehicle 12 with the turbine 20. Additionally, using multiple fuel tanks 50 will increase fuel capacity and operating time. Further, like the dust tank 40, the fuel tank 50 may also be separate from the trailer 14, such as a tanker truck or a mobile fuel tank (not shown) towed by the trailer 14 or another vehicle. Using mobile fuel tanks 50 allows continuous replacement of the fuel tanks 50, increasing fuel capacity and operating time indefinitely.

Figure 7:
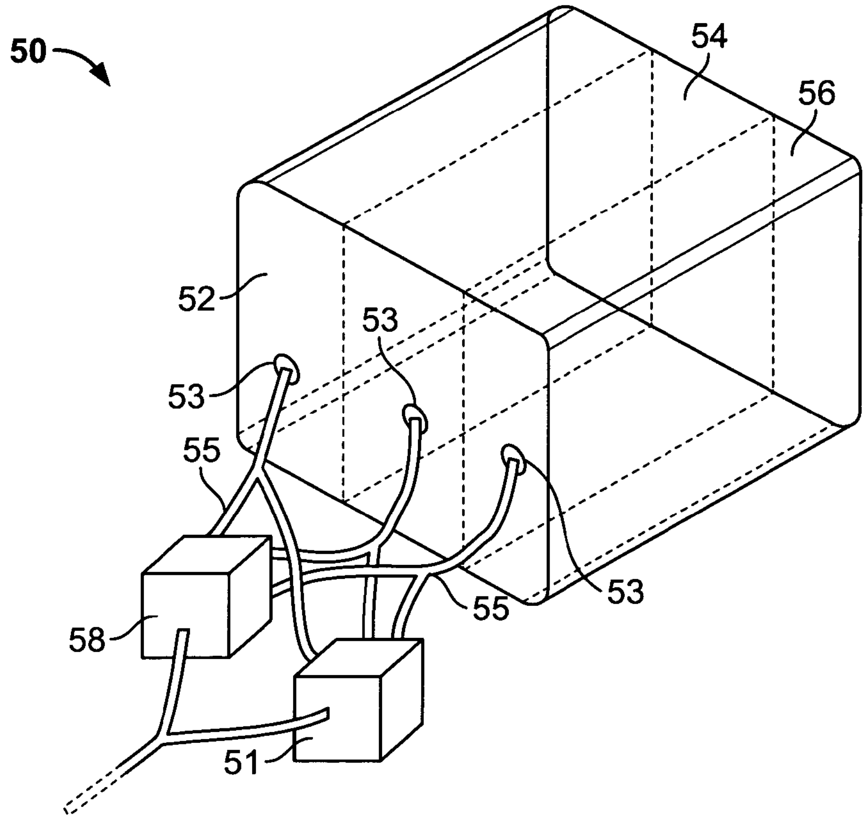
FIG. 7 is a front perspective view of the fuel tank.
Figure 8:
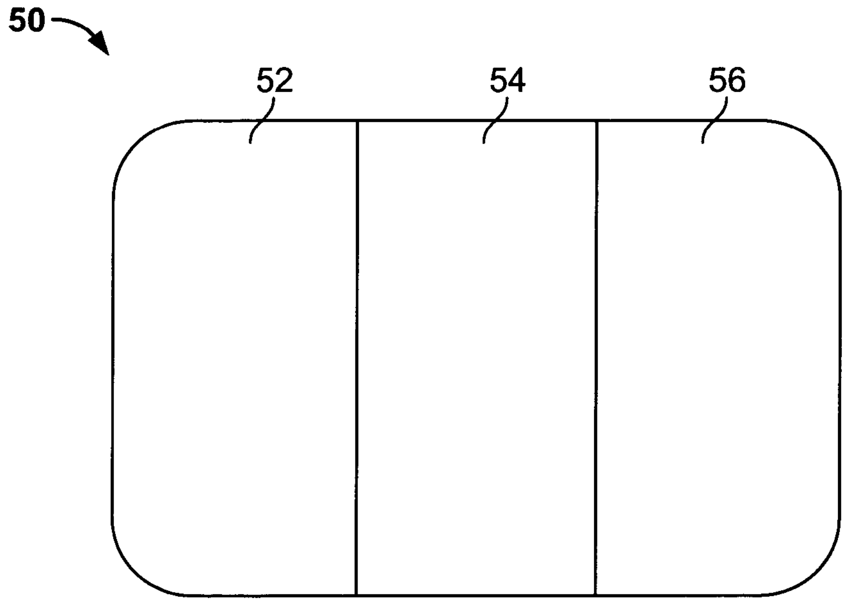
FIG. 8 is a cross-sectional view of the fuel tank.

In the preferred embodiment, a tripartite fuel tank 50 is used, which acts as an alternate or additional counterbalancing mechanism. FIGS. 7 and 8 illustrate a tripartite fuel tank 50, having a left tank 52, a center tank 54, and a right tank 56. A primary pump 51 and a backup pump 58 are both configured to transfer fuel from each of the three tanks 52,54,56 to the fuel line 57 and towards the turbine 20. The backup pump 58 is redundant, and operates when the primary pump 58 malfunctions. The preferred pump 51,58 is a Viking 1½" 3-horsepower pump, made by Viking Pump, Inc., Waterloo, Iowa. Each tank 52,54,56 is connected to both fuel pumps 51,58 by a Y-type connection 55 and has a valve 53 controlling the flow from each tank 52,54,56 to the pumps 51,58. These pumps 51,58 are illustrated in FIG. 7. Additionally, the turbine 20 has its own high-pressure pump (not shown) to move fuel into the turbine 20 from the fuel line 57.

The tripartite fuel tank 50 is securely fixed to the vehicle 12 by conventional means. If the exhaust 22 is directed to the left side of the vehicle 12, fuel is drawn from the right tank 56 first, until the right tank 56 is empty, and then fuel is drawn from the center tank 54. Fuel is drawn from the left tank 52 only after the other two tanks 54,56 are empty. This allows the weight of the remaining fuel in the left tank 52 to act as a counter-balance to the force of the turbine. The opposite is true when the exhaust 22 is directed to the right side of the vehicle 12. Accordingly, the weight of the fuel acts as an alternate or additional counterbalance, until the fuel is used up. Although the preferred embodiment contains a tripartite fuel tank 50, any fuel tank 50 with two or more sections is capable of being an effective counterbalance.

10. Hydraulics

A self-contained diesel-powered hydraulic pumping unit provides power to all the hydraulically-powered components of the unit 10. This hydraulic pumping unit 90 is fixed to the bed 15 of the trailer 14 and is connected to the hydraulic mechanisms by hydraulic lines 92, as shown in FIGS. 3–6. Alternately, the engine of the vehicle 12 or the turbine 20 may be used as a source of hydraulic power. Using the power of engines and turbines to power hydraulic mechanisms is well known.

B. Alternate Embodiment of the Apparatus

In an alternate embodiment, the apparatus includes: (A) a vehicle 112, (B) a moveable crane boom 100 affixed to the vehicle 112, (C) an adjustable nozzle 128 attached to the crane boom 100, (D) a supply of dust 140, (E) at least one compressor 145, (F) a conduit 42 connecting the supply of dust 140, the compressor 145, and the nozzle 128, the compressor 145 being capable of pressurizing the conduit 42, causing air and dust 30 to flow through the nozzle 128, and (G) a jet turbine 20 affixed to the vehicle 112. This alternate embodiment is generally referred to by reference number 110. Many of these components are the same as the components of the just described preferred embodiments, and the differences between the two embodiments are discussed below. The most significant difference between the alternate embodiment and the preferred embodiments is the use of the crane 112 and boom 100 to direct and control the flow of the dust 30 and the exhaust 22.

1. Vehicle

Figure 14:
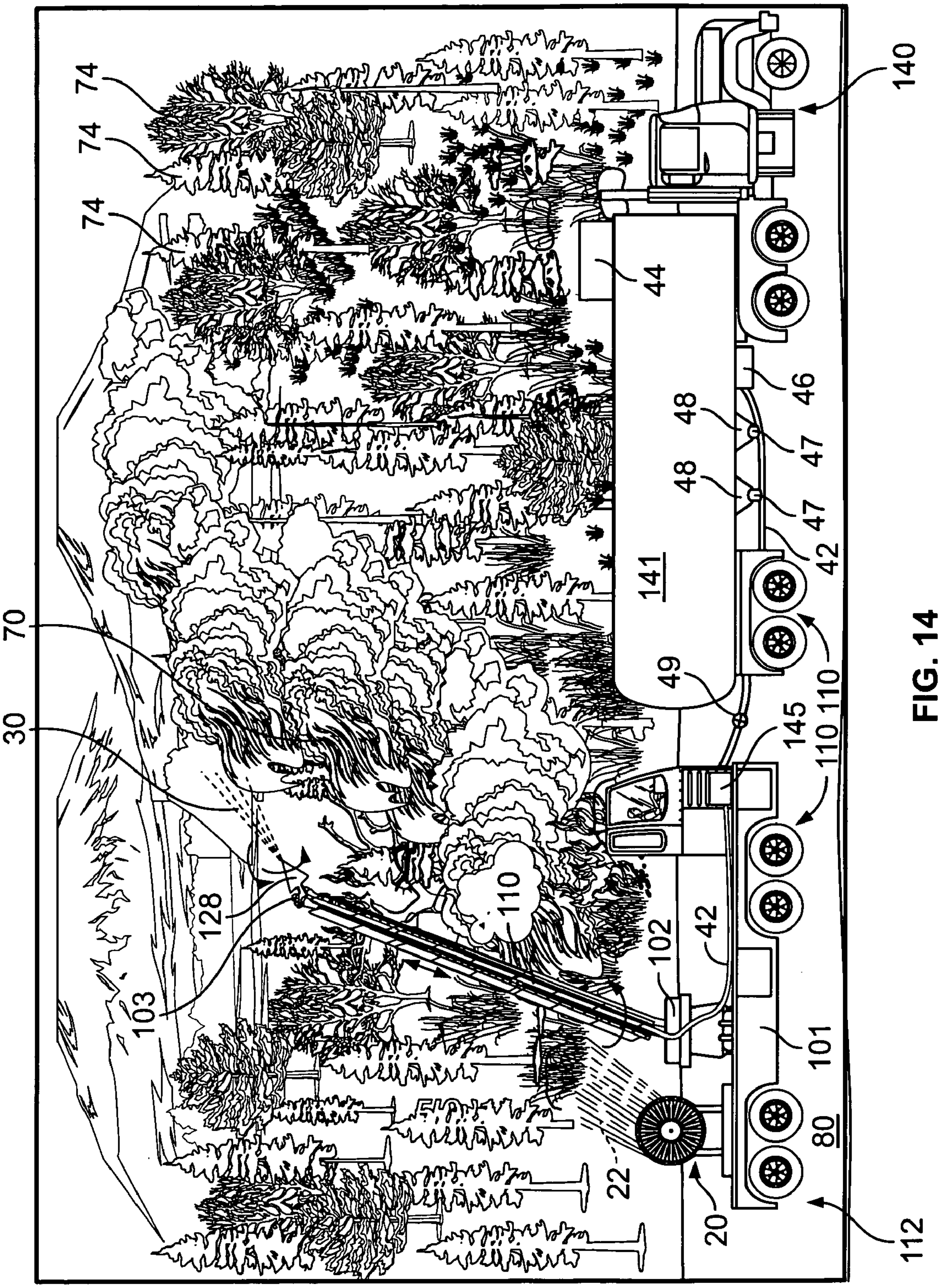
FIG. 14 is a side elevation view of an alternate embodiment of the apparatus wherein an exhaust tube is employed.
Figure 15:
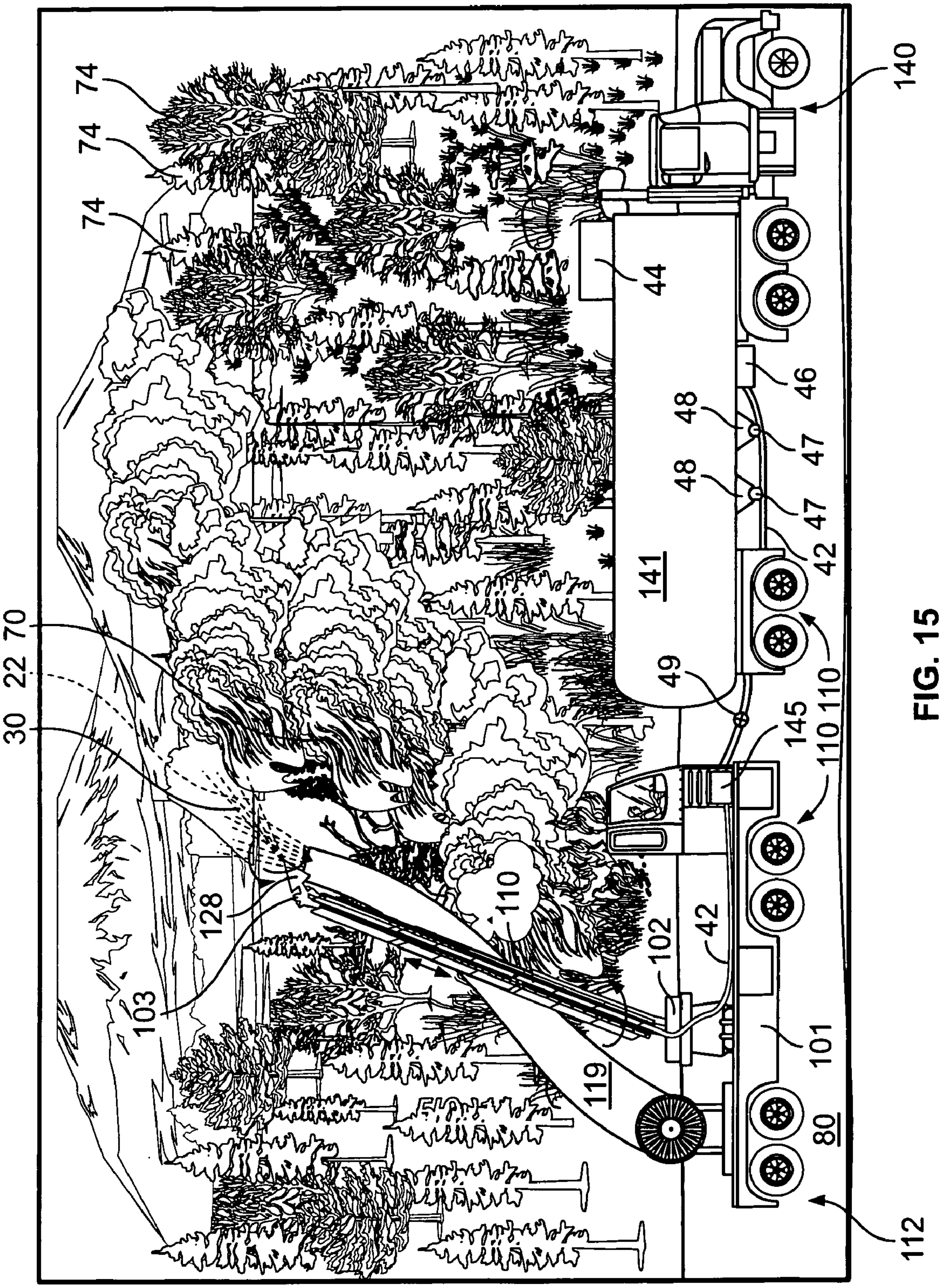
FIG. 15 is a side elevation view of an alternate embodiment of the apparatus, wherein an exhaust tube is not employed.
Figure 16:
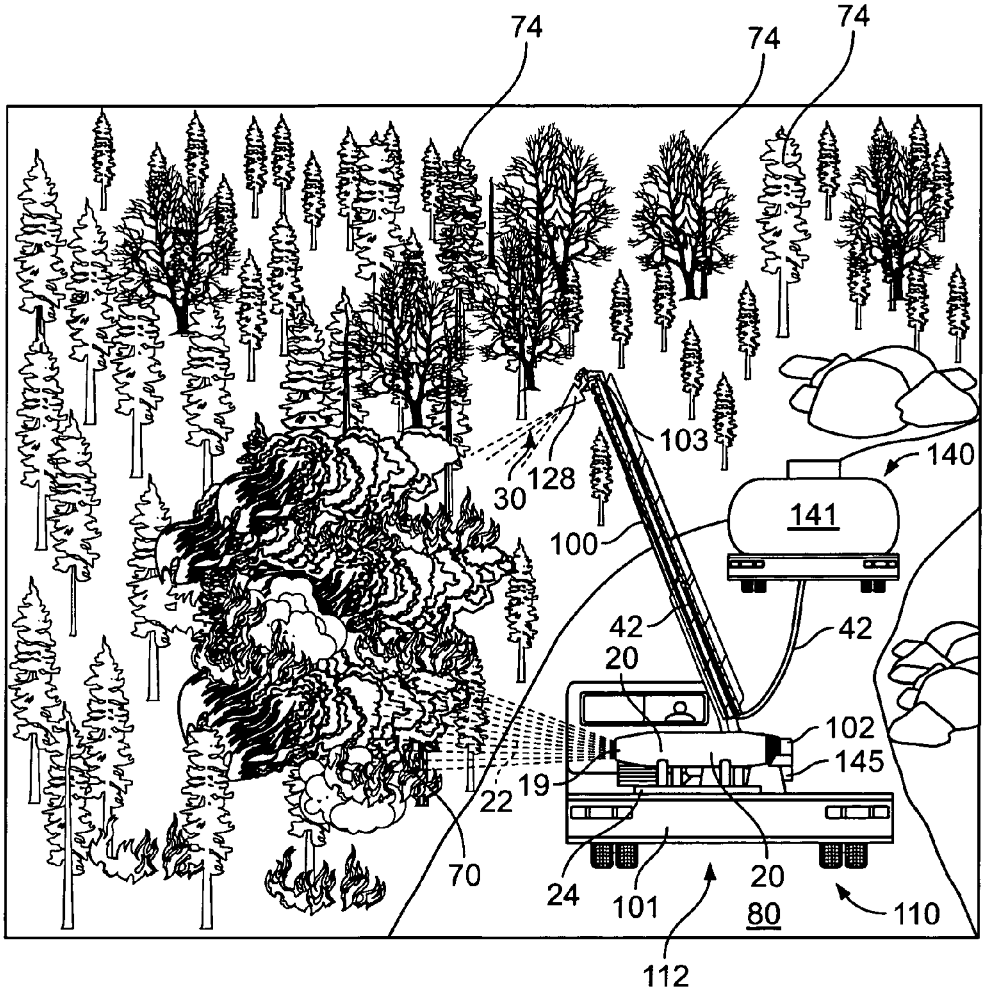
FIG. 16 is a rear elevation view of an alternate embodiment of the apparatus, wherein an exhaust tube is not employed.

In the alternate embodiment 110, the vehicle 112 is a conventional large, industrial crane 112 with a boom 100 attached thereto, as illustrated in FIGS. 14–16. Such cranes 112 have excellent off-road capability and many people are knowledgeable in the operation of such cranes 112. Alternately, another vehicle 112 with a crane boom 100 attached is effective. For example, a crane boom 100 mounted on the back of a flatbed trailer 14, such as the one described in the preferred embodiment, will work.

2. Crane Boom and Nozzle

Dust 30 is applied to the fire 70 from a nozzle 128. The nozzle 128 is connected to a telescopically extending, articulating boom 100 (extendable to approximately 150 feet to 200 feet) attached to a crane 112, as shown in FIGS. 14–16. Specifically, the crane boom 100 is hydraulically operated, allowing it to move towards and away from the location near the leading edge 72 of the fire 70. A first joint 102 connects the telescoping boom 100 to the crane's body 101 and a second joint 103 connects the boom 100 to the nozzle 128. The boom 100 facilitates and permits movement and placement of the nozzle 128 relative to the fire 70. The boom 100 also elevates the nozzle 128 to, if desired, permit spraying the dust 30 downwardly into the fire 70. Specifically, the boom 100 is extendable, retractable and rotatable, and the nozzle 128 can be rotated and swivelled, as indicated by the arrows in FIGS. 14–16. As a result, when the crane 112 is moved into position, the boom 100 and nozzle 128 are movable to direct the spray of dust 30 to a desired location.

As to the nozzle 128, it is capable of movement and changing the dust 30 laden air stream or spray 122 from a broad to a narrow flow to pinpoint the desired target. While one spray nozzle 128 is shown associated with the boom 100, it is recognized that a bank or an array of such nozzles 128 can be employed.

The crane boom may also be affixed to an exhaust tube 119, which directs the exhaust 22 of the turbine 20 to an area proximate the nozzle 128.

3. Supply Tank

The retardant 30 (e.g., dust) supply tank 140 of the alternate embodiment 110, illustrated in FIGS. 14–16, is mobile and not affixed to the vehicle 112. The retardant 30 is preferably stored in a standard tanker trailer 140, such as those commonly used today for liquids and particulates. The tanker 140 is a part of a truck assembly or attached by a fifth wheel to a cab. The tanker 140 is filled with the required retardant 30 (dust), transported to the desired location, unloaded, and removed from the location. Briefly, these tankers 140 generally have associated with them a primary tank 141, one or more frustoconical sections 48 under the primary tank 141 in communication with the tank 141 and a conduit 42 for transporting the retardant 30, valves 47 disposed between the frustoconical sections 48 and the conduit 42 to control the flow of retardant 30, and a tank compressor 44 to pressurize the tank 141. Thus, by turning on the tank compressor 44 and opening up the tank valves 47, the contents of the primary tank 141 are pushed into and through the conduit 42.

Tankers 140 can be sequentially brought to the cranes 112 for unloading. To do this, several tankers 140 are lined up for each crane 112 with personnel removing the pressure hose associated with the crane/nozzle 112, 128 from the first emptied tanker 140 and connecting the pressure hose to a second full tanker 140.

Again different retardants 30 may be used in place of dust.

4. Supply Conduit

As before, a conduit 42 is necessary to transport the retardant dust 30 from the supply tank 140 to the nozzle 128 attached to the crane boom 100. Such a conduit is illustrated in FIGS. 14–16 and is preferably a flexible hose 42 capable of being pressurized.

When the conduit 42 is pressurized by the compressors 44,46,145, air will flow through the conduit 42 and exit through the nozzle 128. Dust 30 from the tank 140 is carried with the air and is also blown out the nozzle 128. A regulator 49 is also employed to control the amount, or flow, of dust 30 (or other retardant) through the conduit 42. If no dust supply 140 is used, the conduit 42 will only connect a compressor 145 with the nozzle 128, and air will flow out the nozzle 128 free of dust 30.

As before, other retardants 30 can be used with the present invention in place of dust. Consequently, implementing a different type of conduit 42 may be necessary if another retardant 30 is used, particularly if the retardant 30 is not in solid powder form. Further, two separate conduits 42, leading from two separate tanks 140, may be used with two different retardants 30 if such an application is desirable.

5. Compressors

Dust 30 is transported through the conduit 42 using compressors 44,46,145 to force pressurized air through the conduit 42. Any compressor capable of generating sufficient pressure to transport the dust 30 will function effectively. Preferably, three compressors are used: a tank compressor 44 and an in-line compressor 46, as described above, and an accelerating compressor 145 to increase the velocity of the air and dust 30 through the conduit 42. These compressors are illustrated in FIGS. 14 and 15. Like the other two compressors 44,46, the accelerating compressor 145 is a low pressure blower, such as that used in cement tankers.

As noted, other retardants 30, besides dust, can be used alone or in different combinations, and many such retardants 30 are in solid powder form. Other retardants 30 may be more or less dense than dust 30, and may accordingly require a more or less powerful compressor 145 to transport them through the conduit 42. Further, if two separate retardant tanks 140 are used, additional compressors 44,46,145 are useful.

In an embodiment mentioned previously, a dust supply 140 is not employed. Rather, only the accelerating compressor 145 is used. This compressor 145 is connected to the nozzle 128 by the conduit 42 and pressurizes the conduit 42, blowing air through the nozzle 128. In this instance, the accelerating compressor 145 is more powerful, in order to generate a more significant air stream.

6. Turbine and Exhaust Tube

The same turbine 22 used in the preferred embodiment of the present invention is also used with the alternate embodiment. The turbine 22 is used in the same manner as in the preferred embodiment, as illustrated in FIGS. 14 and 16. The turbine 22 is directed into the fire 70, and the nozzle 128 at the end of the crane boom 100 introduces dust into the exhaust 22.

Alternately, an exhaust tube 119 is affixed to the outlet 19 of the turbine 20 and affixed to the crane boom 100 to direct the exhaust 22 to an area proximate the nozzle 128, as shown in FIG. 15. The exhaust tube 119 is pressurized by the exhaust 22, so the exhaust 22 retains its velocity until it exits the exhaust tube 119. By moving the crane boom closer to the fire 70, the range of the exhaust 22 can be extended by the length of the crane boom, or the power of the exhaust 22 can be increased at the original distance from the fire 70. The exhaust tube 119 is flexible, allowing it to move with the crane boom 100.

C. Operation

1. Preferred Embodiment

After the assembly is moved into position by the truck 16, the turbine 20 is pointed in the desired direction by manipulating the support 24. The weight 62 of the counterbalancing mechanism 60 is then shifted towards the side of the trailer 14 to which the turbine exhaust 22 is directed, and the fuel is pumped from the fuel tank 50 on the opposite side. After this is completed, the turbine 20 is activated, drawing fuel from the fuel tanks 50 and blowing exhaust 22 in the desired direction.

If a retardant supply tank 40 is used, the valves 47 of the tank 40 are opened, the compressors 44,46 are activated, and the regulator 49 is set to push the retardant 30 through the conduit 42 and into the exhaust 22, where it is blown in the desired direction. If no retardant supply 40 is used, continued operation consists only of running the turbine 20. The unit 10 may be moved or the direction of the turbine 20 changed while the turbine 20 is in operation. Effective use of the unit 10 is explained in the method below.

2. Alternate Embodiment

If a crane boom 100 is employed, the nozzle 128 is pointed in the desired direction by raising or lowering the crane boom 100 and aiming the nozzle 128 to the desired target. After this is completed, the accelerating compressor 145 is activated, pressurizing the conduit 42 and blowing air through the nozzle 128. The turbine 22 is activated, blowing exhaust 22 into the fire 70. The exhaust 22 blows through the exhaust tube 119, if an exhaust tube 119 is used.

The valves 47 of the supply tank 140 are opened, the regulator 49 is set, and the compressors 44,46,145 push the dust 30 through the conduit 42 and out through the nozzle 128, where the dust 30 is blown in the desired direction. If no dust supply 140 is used, continued operation consists only of running the accelerating compressor 145 and/or the turbine 20. The vehicle 112 may be moved, or the direction of the nozzle 128 or height of the crane boom 100 changed, while the turbine is in operation.

One or more nozzles 128 spray the dust or retardant 30 onto the fire 70. If desired, the spraying can be from either in front and above the fire wall 72 down onto the fire 70 or at tree level from directly in front the fire wall 72. The articulating and extending boom 100 gives one the option of putting the nozzle 128 above or below the canopy created by the trees 74. Ideally, several cranes 112 with booms 100 are positioned along a leading edge 72 of the fire 70 to quench the fire 70 and to stop the fire's 70 progress. Each crane 112 will, of course, have one or more supply (dust) tankers 140 associated with it to supply the nozzle 128.

Most of the principles of the claimed method, described below, are not only applicable to the preferred embodiment, but to this embodiment as well.

II. Method

As illustrated in FIGS. 1 and 2, the method of the present invention is performed by operating a strong commercial or industrial turbine 20 (such as a jet engine) to direct the exhaust 22 into a moving front 72 of the fire 70, generally against the movement of the front 72 of the fire 70, directing retardant 30 (dust or other substance) from a supply tank 40 into the exhaust 22 (and not into the turbine 20 itself), and dousing the fire 70 with either or both water and other retardant(s). The method of the present invention can also be practiced without directing the retardant 30 into the exhaust 22 and without incorporating a supply tank 40. The turbine 20 blows directly into the moving front 72 of the fire 70, dislodging naturally-occurring dust, dirt and debris 32 from the ground proximate the fire 70, thus blowing such materials into the fire 70.

A. Positioning the Assembly

The general method of the present invention, illustrated in FIG. 1, is performed by using the exhaust 22 of a jet turbine 20 to blow a retardant 30, such as dust, into a fire 70, thereby strangulating and cooling the fire 70 and either extinguishing the fire 70 or weakening it to make conventional firefighting methods more effective. FIG. 1 shows a fire 70 with a leading edge or front 72 of the fire 70, or firewall. The fire 70 and front 72 are moving in a direction shown by the arrows. Trees are designated generally with reference number 74. A line parallel to the wall 72 in the direction of progression is shown with the imaginary line designated 76.

A crude road 80 adjacent to the fire 70 is constructed, if necessary. The requirements are that large equipment and people must be able to move and pass on the road 80 and move safely and quickly towards and away from the fire 70. Constructing such a road 80 for ingress and egress may consist of no more than bringing down and clearing away trees 74 and foliage. It may, at times, further involve laying down a bed of gravel. Bulldozers or other equipment (not shown), well known to those in road building, will effectively, quickly and safely down and remove trees 74 and foliage.

The direction of the road 80 is also very important. Equipment and/or individuals situated at position Y in FIG. 1 can move many different directions in fighting the fire 70. Assuming the tact is to extinguish the fire 70 shown in FIG. 1 from left to right on the page, the unit 10 can move parallel to the fire 70 (Direction A, parallel to reference line) or angularly away from the fire 70 (Direction B, away from reference line). The soundest approach is Path B in FIG. 1, for as the unit 10 at point Y is putting out the fire 70 and moving from left to right, the firewall 72 is continuing to progress forward. Consequently, the firewall 72 is dynamic, not static, and also moves forward to the position reflected by the phantom lines 78 identified. In short, individuals and equipment moving parallel to the original leading edge 72 of the fire 70 (Path A) will be overtaken by the fire 70 or will move directly into the leading edge 72 of the fire 70 as they move along the leading edge 72 of the fire 70. Conversely, individuals and equipment moving along, but also slightly away from the original leading edge 72 of the fire 70 (angularly), will be moving parallel (relatively) to the moving fire 70 and leading edge 72 of the fire 70.

Ideally, the constructed road 80 is situated so that as the fire 70 is moving forward and being put out by units 10 (e.g., turbine 20, retardant supply 40, boom 100 (if used), and vehicle 12) moving along the leading edge 72 of the fire 70, the units 10 are spaced a consistent and safe distance from the advancing leading edge 72 of the fire 70. The road 80 in FIG. 1 reflects this desire by showing the road 80 skewed or angular, not parallel, to the original moving leading edge 72 of the fire 70.

Preferably, several units 10 are used together to subdue the fire 70, rather than just a single unit 10, as shown in FIG. 1. These several units 10 can more effectively halt a large fire 70 than just one unit 10 working alone because they can blow a greater volume of retardant 30 into the fire 70 and cover a much greater area than a single unit 10. Several units 10 can create a "wall" of pressurized air to stop the forward progress of the fire 70. In addition, use of a single unit 10 could be risky, because a malfunction could leave the operator unprotected from an advancing fire 70. For this reason, having a backup unit 10 on standby is desirable, even if a single unit 10 can handle the fire 70 by itself.

Note also, to facilitate easy movement of the equipment, with or without remote control, rails or tracks can be installed, time permitting, on the road 80 for the unit 10 and other equipment. The equipment may be augmented to facilitate movement on rails/tracks.

The method of the invention does not require construction of a road 80 if a suitable road or other passage 80 is already available and accessible. Additionally, although the invention is most effective when the exhaust 22 is directed at the leading edge 72 of the fire 70, directing the exhaust 22 at any edge of the fire 70 subdues or extinguishes the flames. Further, the utility of the invention is not limited to forest or brush fires. The invention can subdue any type of fire, either stationary or moving, including without limitation building fires or mine fires.

B. Directing the Exhaust Into the Fire

When fighting a moving fire 70 such as a forest or brush fire, the most important sections of the fire 70 to subdue are the edges (the fire wall 72), because the fire 70 cannot grow larger unless the edges move or spread. Accordingly, the invention is most effective when the turbine 20 is directed into the leading edge 72 of the fire 70, because the exhaust 22 both subdues the flames and stops the forward progress of the fire 70. The exhaust 22 creates a mass of air directed into the advancing fire front 72 to stall the forward movement of the front 72. Once the forward movement of the front 72 is stalled, the intensity of the fire front 72 will diminish rapidly simply because the majority of the fuel in the brush or timber supporting the fire 70 will have been spent. As stated above, the invention is most effective when the exhaust 22 is directed into the leading edge 72 of the fire 70, but directing the exhaust 22 into any edge of the fire 70 will assist in diminishing the flames and stopping the fire's 70 advancement.

C. Exhaust Directed Against Movement of Front

The invention is most effective when the exhaust 22 is directed against the direction of movement (indicated by arrows labeled 82) of the front 72 of the fire 70. This ensures the exhaust 22 is blowing the fire 70 backwards into previously burnt areas or burning areas where little or no fuel is present, rather than blowing the fire 70 onto unburnt areas where fuel may be present. However, the exhaust 22 need not be directed in the exact opposite direction the fire is moving 82, and a general approximation is sufficient. Further, the invention is still effective even if the exhaust 22 is directed at a significant angle to the direction of movement 82 of the fire 70.

D. Introducing Dust Into the Exhaust

Dust 30 is introduced into the exhaust 22 after the exhaust 22 leaves the turbine 20, blowing the dust 30 into the fire 70. As described above, this dust 30 is transported along with the unit 10 in a dust supply tank 40. Preferably, the dust 30 is directed into the exhaust 22 through a conduit 42, using compressors 44,46 to transport the dust 30 from the dust tank 40 into the conduit 42 and through the conduit 42 into the exhaust 22. Other means of introducing dust 30 into the exhaust 22 are plentiful.

Blowing dust 30 into the fire 70 aids in diminishing and extinguishing the fire 70. It is well known that applying dust 30 to a fire 70 can quench the fire 70, primarily by reducing the supply of oxygen available to the fire 70. Accordingly, the present invention is most effective when dust 30 is blown into the fire 70 by the exhaust 22. Doing so subdues the fire 70 both by preventing it from spreading to fresh fuel, and also, by cutting off the oxygen supply to the fuel the fire 70 has already engulfed. Alternatively, another retardant 30 may be used in place of dust. The advantages (environmental and otherwise) of using dust are described above, but a large number of retardants 30 can extinguish a fire 70 as quickly and effectively as dust, perhaps even more so. As described above, the invention will also work without the use of a dust supply 40.

E. Use of the Invention Without a Dust Supply

In many environments, using a dust supply 40 is unnecessary due to naturally occurring dust and debris 32 around the fire 70. This is especially true in dry, arid regions where fires are most likely to occur and spread quickly. Dirt, sand, ashes, and other material 32 around the fire 70 will be lifted by the force of the exhaust stream 22 as it passes by. This material 32 blown into the fire 70 effectively aids in extinguishing the fire 70. Even if little or no dust 32 is raised by the force of the exhaust 22, the invention will still subdue the fire 70 by blowing the fire 70 backwards onto itself, into burnt areas lacking in fuel and preventing the fire 70 from spreading. Accordingly, although use of a dust supply 40 is preferable in some circumstances, it is not necessary.

F. Dousing With Water or Retardant

The unit 10 alone may not extinguish the fire 70 completely, but only diminish its size and temperature and stall its advancement. To completely extinguish the fire 70 in that case, it is necessary to use more conventional firefighting methods, such as dousing the fire 70 with water or common flame retardant chemicals. Accordingly, the use of these or other known firefighting methods to ensure that the fire 70 is completely extinguished may be involved. For example, conventional fire engines and water trucks can move close to a diminished fire 70 to be effective in extinguishing it. Dousing the fire 70 by dropping large amounts of water or flame retardant chemicals from aircraft is yet another commonly used tool for extinguishing fires that will be more effective once the fire 70 is diminished by the exhaust 22.

G. Method for Diverting Smoke

The present invention can also be used as a method for diverting smoke from highways, residential areas, or other smoke-sensitive areas where smoke is undesirable. Accordingly, the present invention also comprises operating a turbine 20 to direct its exhaust 22 into the smoke, blowing the smoke in a desired direction. Normally, this desired direction is away from smoke-sensitive areas. In operation, the unit 10 is parked in an area between the smoke and the protected, smoke-sensitive area, and the exhaust 22 is directed into the smoke and away from the smoke-sensitive area. Often, the smoke is blown more effectively if the exhaust 22 is elevated by adjusting the support 24. No supply of dust or other retardant 40 is needed, nor is the capability of raising dust 32 from the land. Preferably, the turbine 20 is a jet turbine with an exhaust 22 comprised of ambient air.

H. Safety and Environmental Concerns

Safety is essential throughout the entire process just described, as fires, particularly large ones, place any person in their path at great risk. Accordingly, several safety measures are contemplated for use with the present invention. First, as described above, the unit 10 and all the components of the invention may be remote controlled from a distance. Additionally, even if the vehicle 12 is manually operated, the components of the unit 10 should be controlled remotely by the operator or by someone at a distance, so the operator will not have to leave the protected cabin of the vehicle 12. As described above, the cabin is protected from potential explosion by a plate 13 of tank steel. Further, the equipment used must be able to withstand high temperatures and difficult conditions involving dust, debris and water. Finally, an additional safety measure is the use of multiple units 10 to prevent a large fire 70 from overtaking a single unit 10, and to provide backup in case a single unit 10 malfunctions.

Environmental safety is another benefit of the present invention. As noted previously, the dust 30, preferably composed of granite, limestone, sand, or similar inert material, can be left in place after the fire 70 is put out. Their coating of the area should not negatively affect the environment or ecosystem.

I claim:

1. An apparatus for subduing a fire comprising:

a vehicle;

a turbine affixed to the vehicle having an exhaust;

a generally inert particulate forced under pressure into the exhaust from a separate retardant supply tank, the particulate generally not reacting with foliage or animals if left in place after subduing the fire; and, an adjustable counterbalancing mechanism separate and independent from the turbine affixed to the vehicle to optionally change the center of mass of the vehicle and counteract the force of the exhaust and stabilize the vehicle and the jet engine, the counterbalancing mechanism comprising:

a moveable weight separated from the turbine and at least one powered cylinder attached to the moveable weight for moving the weight relative to the vehicle to counteract a force created by the exhaust.

2. The apparatus of claim 1, wherein the movable weight comprises:

a cylinder capable of extending and retracting pivotably attached at one end to the vehicle and at the other end to a heavy object;

a pivotable connection between the heavy object and the vehicle so that as the cylinder extends and retracts, the heavy object pivots about the pivotable connection.

3. The apparatus of claim 1, wherein the movable weight comprises:

a cylinder capable of extending and retracting attached at one end to the vehicle and at the other end to a heavy object;

a mount secured to the vehicle for supporting he heavy object so that as the cylinder extends and retracts, the heavy object moves relative to mount.

* * * * *